(12) United States Patent
Hart et al.

(10) Patent No.: US 6,679,033 B2
(45) Date of Patent: Jan. 20, 2004

(54) METHOD AND APPARATUS FOR PACKING

(75) Inventors: Colin R. Hart, Klive, IA (US); Kenneth M. Welborn, Charlottesville, VA (US); Jimmy L. Meyer, Waynesboro, VA (US)

(73) Assignee: F. R. Drake Company, Waynesboro, VA (US)

( * ) Notice: Subject to any disclaimer, the term of this patent is extended or adjusted under 35 U.S.C. 154(b) by 0 days.

(21) Appl. No.: 10/143,843

(22) Filed: May 14, 2002

(65) Prior Publication Data

US 2002/0189209 A1 Dec. 19, 2002

Related U.S. Application Data

(60) Provisional application No. 60/290,342, filed on May 14, 2001.

(51) Int. Cl.[7] .................................................. B65B 5/10
(52) U.S. Cl. ........................... 53/475; 53/473; 53/242; 53/243; 53/247; 53/250
(58) Field of Search .................... 53/473, 475, 242, 53/2.43, 245, 247, 250, 251

(56) References Cited

U.S. PATENT DOCUMENTS

| | | | | |
|---|---|---|---|---|
| 1,879,393 A | | 9/1932 | Miller | |
| 3,475,877 A | * | 11/1969 | Fuller et al. | 53/437 |
| 3,791,099 A | * | 2/1974 | Wagner | 53/447 |
| 4,028,864 A | * | 6/1977 | Bell | 53/438 |
| 4,830,564 A | | 5/1989 | Walker et al. | |
| 5,042,233 A | * | 8/1991 | Huang et al. | 53/468 |
| 5,136,826 A | * | 8/1992 | Carson et al. | 53/443 |
| 6,052,969 A | | 4/2000 | Hart et al. | |
| 6,238,164 B1 | | 5/2001 | Isaacs | |
| 6,322,316 B1 | | 11/2001 | Hart et al. | |

OTHER PUBLICATIONS

U.S. patent application Ser. No. 10/143,861, Hart et al.

* cited by examiner

*Primary Examiner*—Scott A. Smith
*Assistant Examiner*—Hemant M. Desai
(74) *Attorney, Agent, or Firm*—Liniak, Berenato & White, LLC

(57) ABSTRACT

A packing method and system are disclosed which system includes a first platform having a product support surface for supporting a product and a second platform for supporting a box into which the product is to be packed. After a box is received on and secured to the second platform, the second platform is rotated so that the open top of the box faces the first platform and moved toward the first platform until the box substantially surrounds the product on the product support surface. The first and second platforms are then rotated simultaneously so that the product is transferred from the product support to the box, and the full box is discharged to a discharge conveyor.

22 Claims, 17 Drawing Sheets

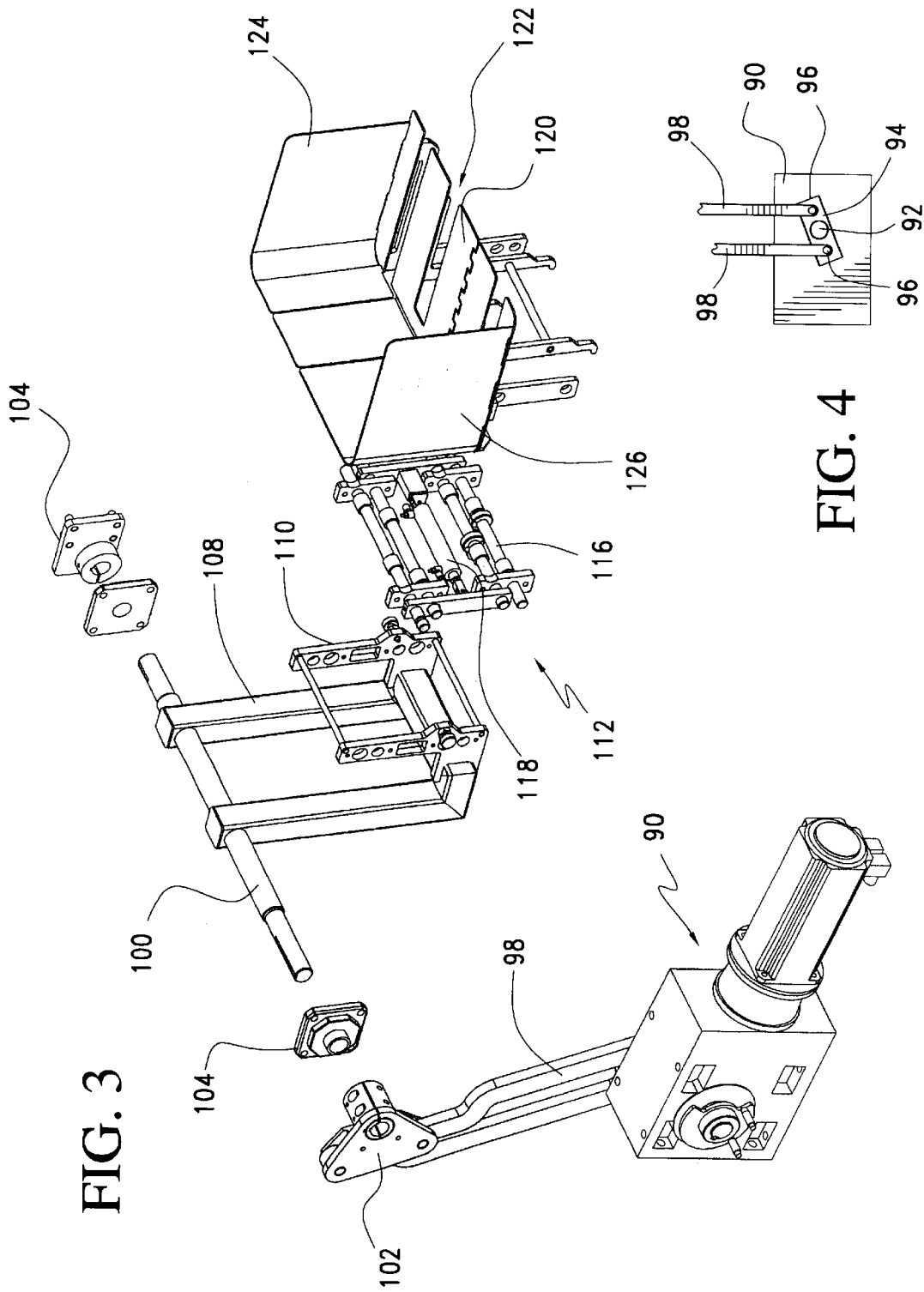

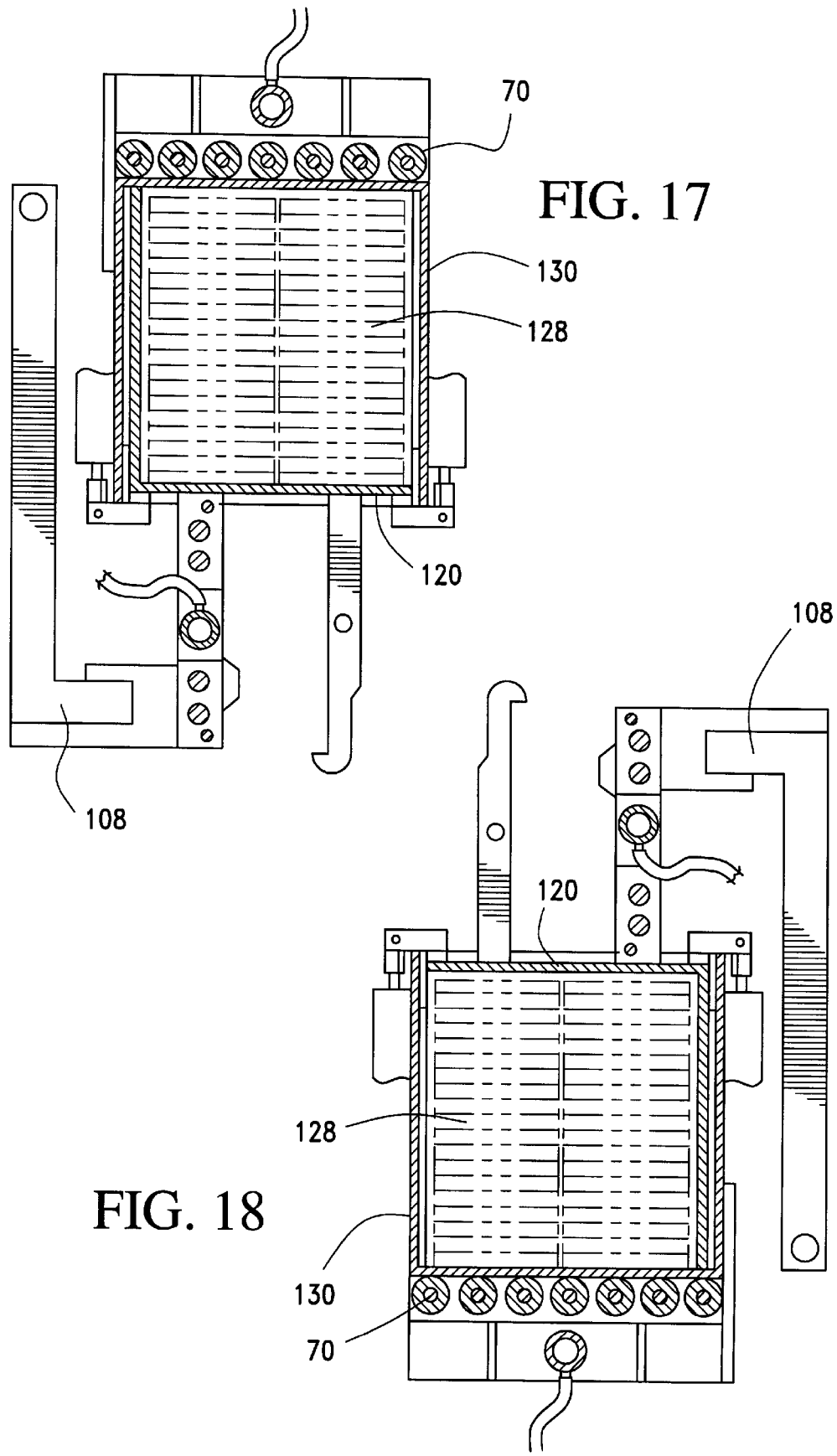

METHOD AND APPARATUS FOR PACKING

CROSS-REFERENCE TO RELATED APPLICATIONS AND CLAIM TO PRIORITY

The present application claims the benefit of U.S. provisional patent application serial No. 60/290,342, filed May 14, 2001, the disclosure of which is incorporated by reference.

FIELD OF THE INVENTION

The present invention is directed to a method and apparatus for packaging a product, and, more specifically, toward a method and apparatus for transferring a plurality of stacks of discrete objects supported by a platform from the platform to a box while maintaining the integrity and arrangement of the stacks.

BACKGROUND OF THE INVENTION

Various packing or packaging machines are known for placing a product into a box, carton, or other container. However, special problems are encountered when the product to be packaged comprises stacks of discrete objects. These stacks, for example, may have previously been formed by a stacking machine and set on a support surface for further processing. Such stacks can be lifted manually and placed into a box, but if multiple stacks have to be placed in the same box, it can be difficult to maintain the integrity of the stacks as they are moved; this leads to the occasional need for a manual restacking step. Furthermore, it is difficult to lift multiple adjacent stacks of objects at the same time by hand, and therefore a person would normally be limited to lifting the stacks one at a time when placing them in a box. However, if the stacks are to be packed tightly in the box, that is, if they are to be packed with a minimal amount of space between the stacks themselves and between the stacks and the inner walls of the box, it may be difficult to manually position the stacks that are adjacent a sidewall, and especially difficult to place the last stack into a box, which stack will be bounded on four sides by box sidewalls or other stacks of products.

Stacks of products such as those discussed above can be moved by gripping the top and bottom of the stack and applying pressure to hold the stack together while it is moved. An apparatus for gripping and moving stacks in this manner is disclosed in a co-pending application entitled "Stack Transfer Device" filed concurrently herewith and assigned to the assignee of this application, the disclosure of which is hereby incorporated by reference. However, gripping a stack from the top and bottom makes it difficult to insert the stack into a previously formed box having an open top. To package a stack that is gripped in this manner, either a box must be formed around the stacks of objects while they are being gripped, or the objects must be deposited on a surface and moved again from the surface to a box.

When using a stack transfer device, such as the one disclosed in the above application, the stacks are often placed on a device called a matrix former before they are packaged. A matrix former comprises a horizontal platform and two or three upstanding, movable sidewalls forming a structure that resembles a cube with an open top and no front wall. The purpose of the matrix former is to consolidate several stacks by sliding them toward one another and removing the spaces therebetween, to make them easier to fit into a box. The upstanding walls of the matrix former, however, make it even more difficult to transfer the stacks from the matrix former to a preformed box or case. It would therefore be desirable to provide a method and apparatus for automatically, simultaneously, transferring a plurality of stacks of discrete objects from a support platform, such as a matrix former, to a box in a manner that preserves the integrity and arrangement of the stacks.

SUMMARY OF THE INVENTION

These problems and others are addressed by the present invention which comprises a method and apparatus for transferring objects, and especially multiple stacks of discrete objects, from a support surface to an open-topped box. While the present invention could be used in a number of environments, it finds particular use in transferring stacks of frozen hamburger patties from a support surface having upstanding walls to an open-topped cardboard box and will be described in terms of such as system, it being understood that the invention is by no means limited to use in such environments.

The preferred embodiment of the invention comprises a first generally horizontal platform, which forms a part of a matrix former, on which a plurality of stacks of discrete objects are to placed, and a second platform for supporting a box into which the stacks are to be packed. The second platform is movable vertically and can also be pivoted about an axis parallel to its box-contacting surface. The second platform includes at least one gripper for holding the bottom of the box securely against the box-contacting surface and, preferably, also includes a plurality of fingers for engaging the top edges of the box to control the movement of the box and to hold down flaps extending from the top edge of the box. The box-contacting surface of the second platform also preferably includes a plurality of rollers that allow an empty box to roll on and off the platform when the platform is inclined.

In operation, the second platform is aligned with a conveyor that feeds empty boxes one at a time. A box rolls onto the second platform and is gripped by at least one gripper on the second platform to hold it in place, with its bottom on rollers and its open top facing away from the rollers. The second platform is then pivoted 180 degrees to an inverted position, with the open box top positioned over and facing down towards the first platform above the stacks of objects on the first platform. The second platform is next lowered over the stacked objects, until the first platform is about even with or slightly inside the top opening of the box so that the stacks of objects are disposed completely within the box. The orientation of the stacked objects is maintained by the walls of the box and the platform. The first and second platforms are pivoted together, until the top opening of the box is again facing upwardly and the objects are supported on the closed bottom of the box rather than by the first platform. The second platform and box are moved away from the first support, so the first support may return to its original orientation. The second support is then moved to a discharge location where it tilts to slide the fully loaded box onto a conveyor for further processing, and finally the second support returns to its original position to receive another empty box from the feeding conveyor to start the process again.

It is therefore a principal object of the present invention to provide an apparatus for packing a plurality of stacks of discrete objects in a container.

It is another object of the invention to provide an apparatus for transferring a plurality of stacks of discrete objects from a platform to a box while maintaining the integrity and mutual relationship of the stacks.

It is a further object of the invention to provide a method for packing a plurality of stacks of discrete objects in a box.

It is still another object of the invention to provide a method of packing stacks of discrete objects supported by a platform having at least one upstanding sidewall taller than the stacks of objects.

It is yet another object of the invention to provide an apparatus for simultaneously boxing a matrix of discrete objects.

In furtherance of these objects, a packing apparatus is provided that includes a first platform having a product contact surface. The first platform is pivotable about an axis parallel to and spaced from the product contact surface between a first position, wherein the product contact surface faces in a first direction, and a second position, wherein the product contact surface faces in a second direction. The apparatus also includes a second platform comprising a box support having a box contact side and a box holder for holding a box on the box support. The second platform is movable between a first position and a second position, and the box support is pivotable between a first angular orientation and a second angular orientation.

Another aspect of the invention comprises a method of packing a product that involves providing a first platform having a product support surface facing in a first direction and placing a product to be packaged on the product support surface. A second platform including a box support having a box contact surface is aligned with a first conveyor and receives a box having a closed bottom and an open top. The box is secured to the box support with the closed bottom in contact with the box contact surface. The box support is pivoted so that the box contact surface faces the first platform product support surface and the box open top faces the product. The second platform is moved towards the first platform until the product passes through the box top opening, and the first platform and the box support platform are pivoted until the box open top faces in the first direction. The second platform is moved away from the first platform, and the first platform is pivoted until the product support surface faces in the first direction. The second platform is aligned with a second conveyor, and the box is released onto the second conveyor.

Another aspect of the invention comprises a packing apparatus that includes a first platform having a product contact surface that is pivotable, via an actuator, about an axis parallel to and spaced from the product contact surface between a first position, wherein the product contact surface faces in a first direction, and a second position, wherein the product contact surface faces in a second direction. The apparatus also includes a second platform that includes a box support having a first wall and a box contact side and a positioning device for positioning and holding a box on the box support. The positioning device includes a second, movable, wall and an actuator for moving the movable wall with respect to the first wall. At least one gripper is also provided for gripping an edge of a box having a closed bottom and open top on the box support. The second platform is movable between a first position and a second position, and the box support is pivotable between a first angular orientation and a second angular orientation with respect to said first platform. The apparatus also includes at least one guide track for guiding the movement of the second platform between the first position and the second position, a drive belt extending between a first wheel and a second wheel, and a drive operably coupled to the drive belt. The second platform is coupled to the drive belt.

BRIEF DESCRIPTION OF THE DRAWINGS

These and other objects and other objects and advantages of the invention will be better understood after a reading of the following detailed description of the invention together with the following drawings.

FIG. 3 is an exploded perspective view of matrix former of FIG. 1.

FIG. 4 is a rear elevational view of the motor of the matrix former of FIG. 1.

FIG. 17 is a side elevational view, partly in section, of the lift apparatus and the matrix former in a position similar to that shown in FIG. 9.

FIG. 18 is a side elevational view, partly in section, of the lift apparatus and the matrix former in a position similar to that shown in FIG. 10.

DETAILED DESCRIPTION OF THE INVENTION

Figure 1:
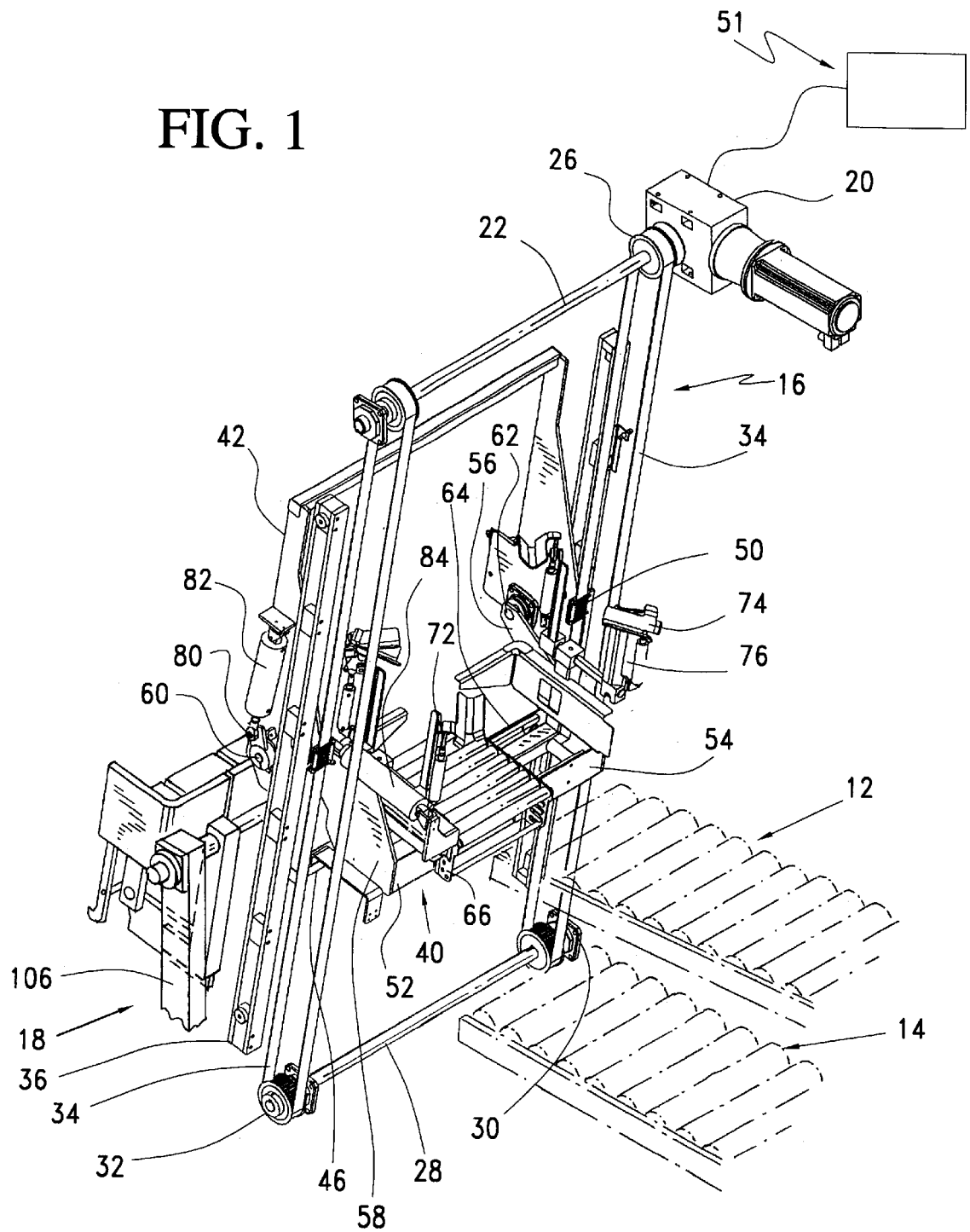
FIG. 1 is a perspective view of the packing system of the present invention which system includes a feeding conveyor, a discharge conveyor, a lift apparatus and a matrix former.

Referring now to the drawings, wherein the showings are for the purpose of illustrating a preferred embodiment of the invention only, and not for the purpose of limiting same, FIG. 1 shows a packing apparatus designated generally by the numeral 110 which includes an empty-box feeding conveyor 12, a packed-box discharge conveyor 14, a lift mechanism 16, and a matrix former 18.

Figure 2:
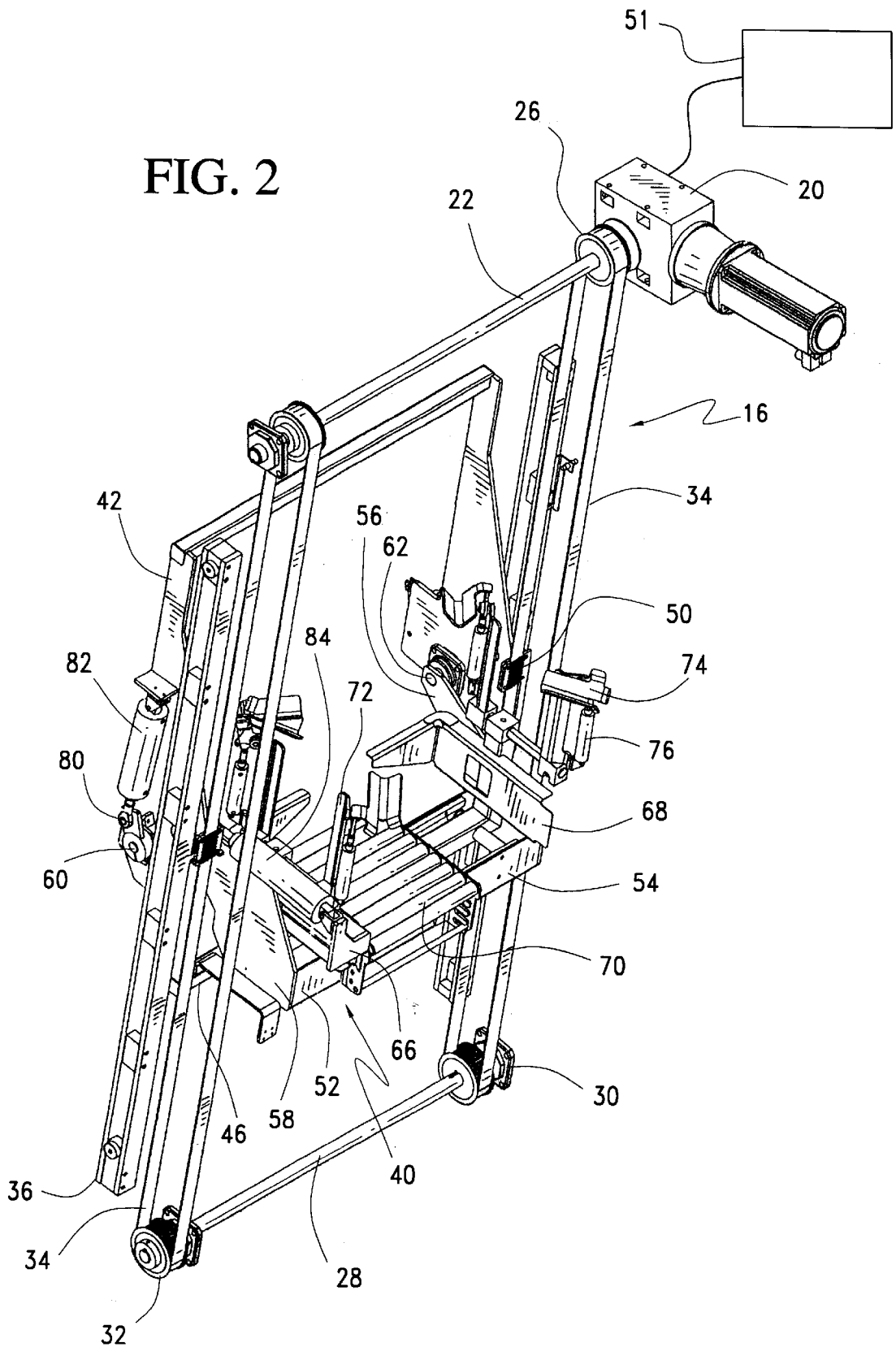
FIG. 2 is an assembly diagram of the lift apparatus of the packing system shown in FIG. 1.

Lift mechanism 16, as best shown in FIG. 2, includes a reversible motor 20 for turning a drive shaft 22 which is supported on one end by motor 20 and on the other by a bearing 24 mounted on a support (not shown). First and second flanged wheels 26 are mounted on shaft 22 for rotation therewith, and a second shaft 28 is rotatably supported by first and second bearing plates 30 mounted to supports (not shown) parallel to the drive shaft 22. First and second flanged wheels 32 are mounted on second shaft 28 and aligned with the flanged wheels 26 on the drive shaft 22. First and second belts 34 extend between aligned pairs of flanged wheels 26 and 32 on the shafts 22 and 28 such that shafts 22 and 28 are rotated simultaneously when motor 20 turns drive shaft 22. Parallel guide tracks 36 are mounted adjacent the belts 34, each track 36 defining a channel facing toward the channel of the other track 36.

Figure 7:
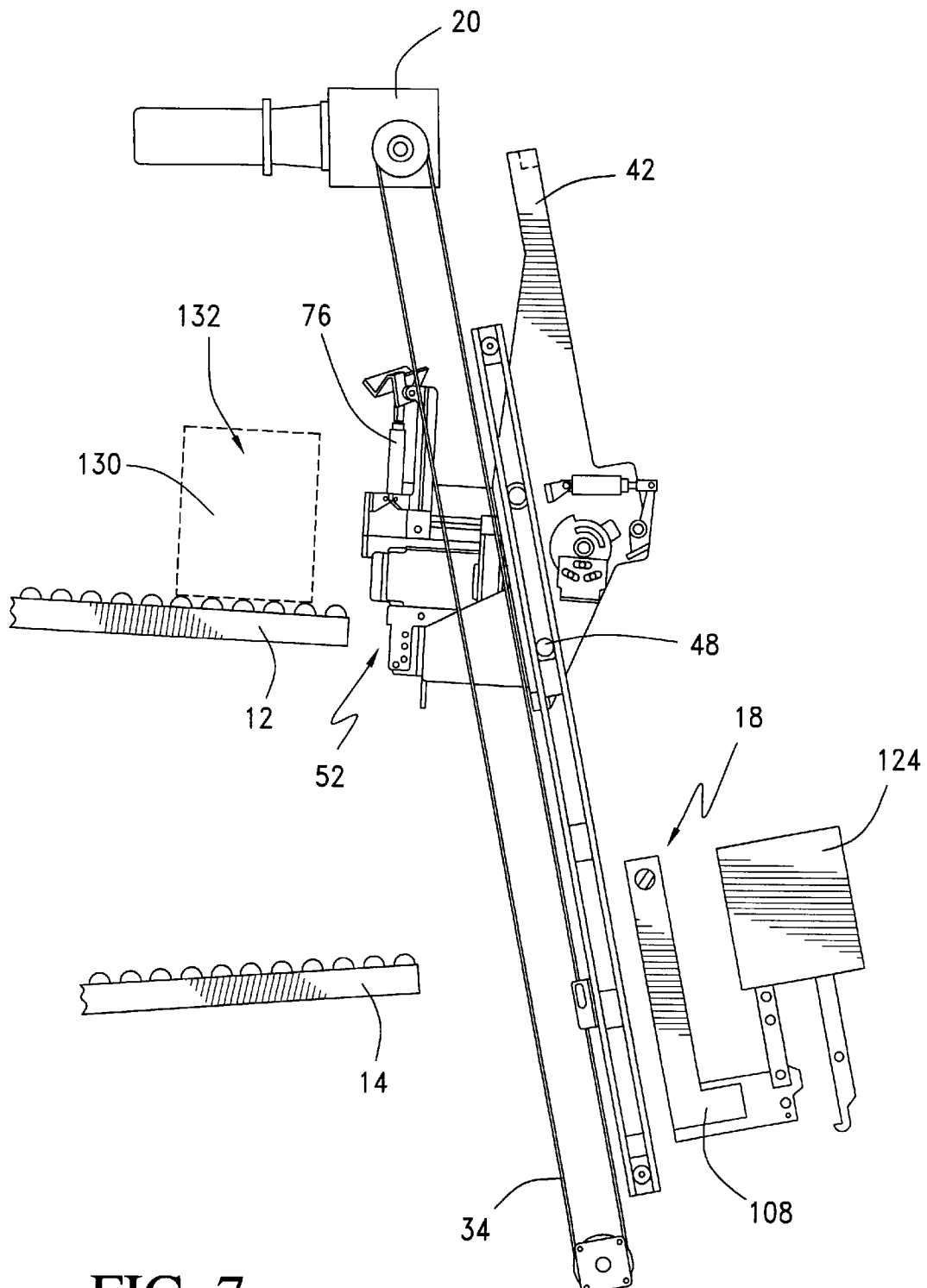
FIG. 7 is a side elevational view of the packing system of FIG. 1 in a first configuration with the lift positioned to receive an empty box from the feeding conveyor.
Figure 8:
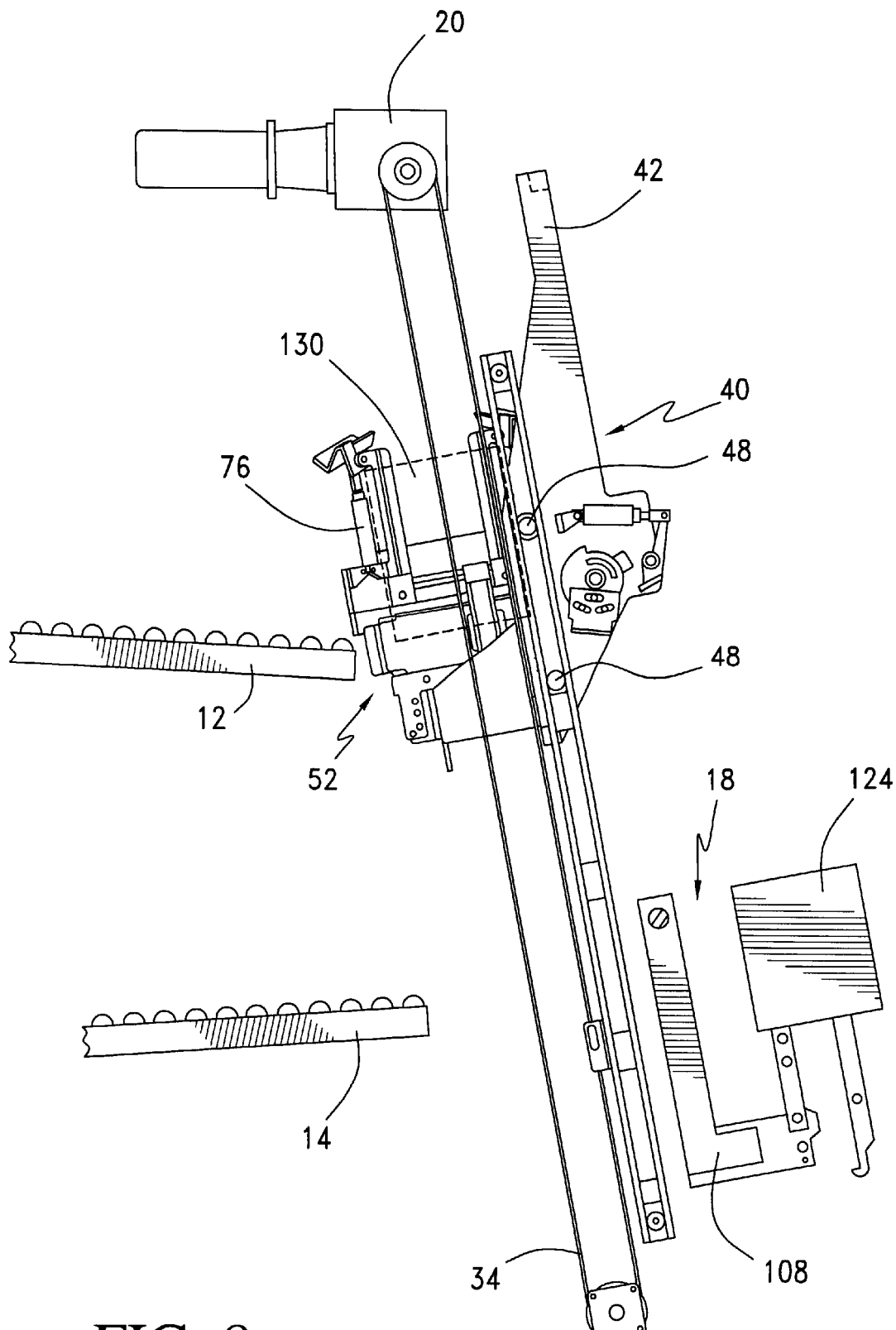
FIG. 8 is a side elevational view of the packing system of FIG. 1 in a second configuration with an empty box gripped on a platform of the lift apparatus.

Lift platform 40 includes a first sidewall 42, a second sidewall 43, a top support 44, and a bottom support 46 supported for rolling movement along the guide tracks 36 by wheels 48, as best shown in FIG. 7, and is clamped to belts 34 by clamps 50. Thus, motor 20 moves lift platform 40 between raised and lowered positions on guide tracks 36 by rotating shaft 22. Motor controller 51 controls the operation of motor 20, and thus the position of lift platform 40 with respect to the guide tracks 36 and the matrix former 18.

Lift platform 40, as best shown in FIG. 2, further includes a pivoting platform 52 mounted on lift platform 40 for pivoting movement with respect to platform 40. Platform 52 includes a base frame 54, including a projecting arm 56 and a sidewall 58. A first axle 60 extends from first sidewall 42 and connects to sidewall 58, while a second axle 62 extends from second sidewall 43 and connects to projecting arm 56. The axles 60 and 62 are coaxial. Under the influence of appropriate actuators, pivoting platform 52 may be pivoted between first and second positions with respect to lift platform 40.

Figure 5:
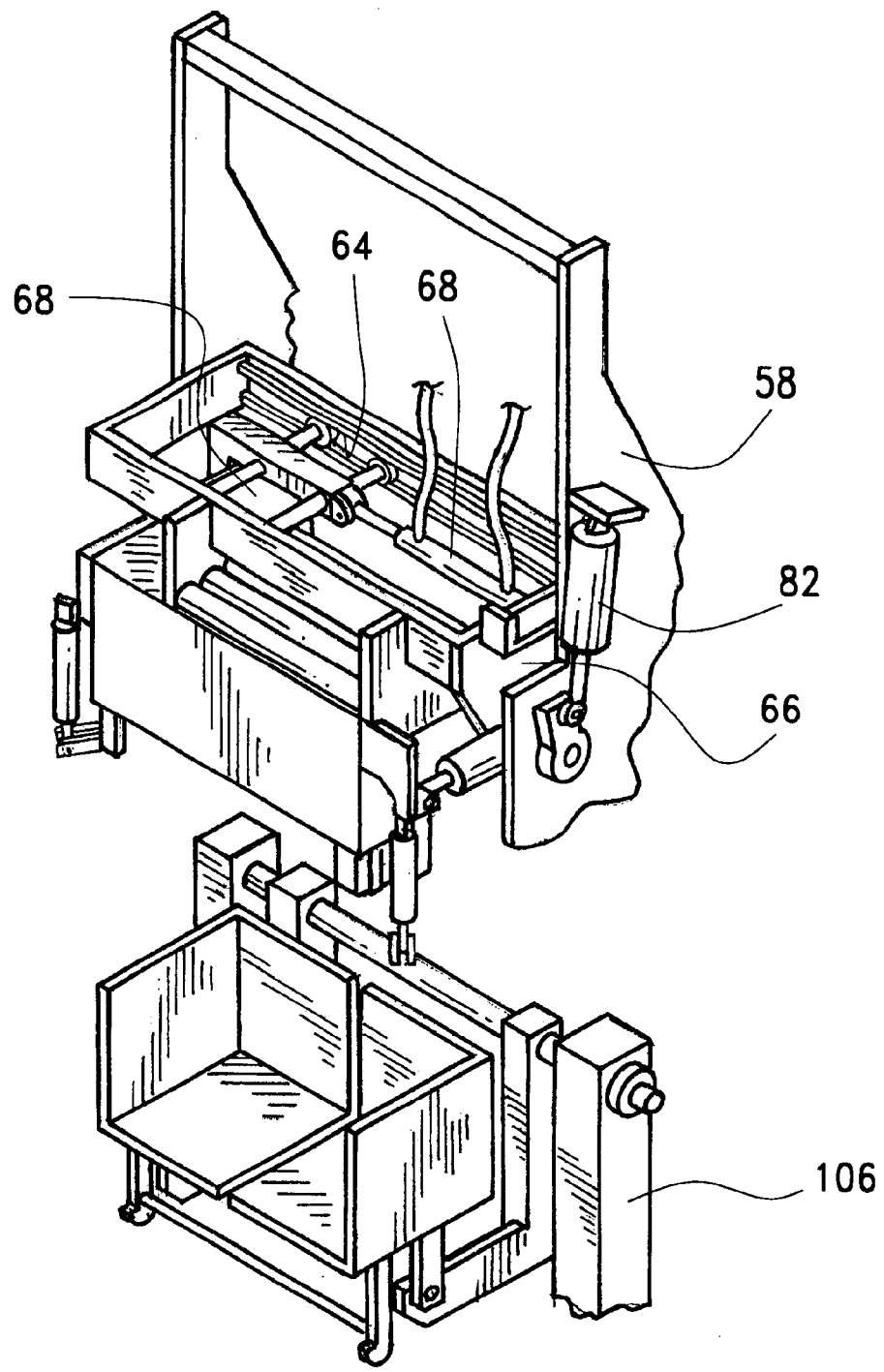
FIG. 5 is a fragmentary perspective view of the box holding portion of the lift apparatus in an inverted position.

Pivot platform 52 further includes a guide track 64, as best shown in FIG. 5, connected between sidewall 58 and sidewall 43, a first fixed wall 65 adjacent track 64 and a second wall 66 slidingly connected to track 64. An actuator 68, shown in FIG. 5, is mounted adjacent track 64, for moving sliding wall 66 toward and away from fixed wall 65 to grip a box placed therebetween. A roller support 70, comprising a plurality of free-spinning rollers, is mounted on base frame 54 between sidewalls 43 and 58. Four posts 72 extend from walls 65 and 66 which posts are mutually parallel and arranged generally in a square. The top of each post 72 includes a finger 74 pivotally attached thereto, and an actuator 76 connects each finger 74 to the top of sidewall 65 or sliding wall 66, so that the fingers 74 can be pivoted between first and second positions with respect to the sliding walls by the actuators 76 and function as grippers for gripping the top edge of a box.

A crank arm 80, as best shown in FIG. 1, is attached to the end of axle 60, and a first cylinder and piston assembly 82 extends between crank arm 80 and sidewall 42 of lift platform 40. A second cylinder and piston assembly 84 extends between pivot platform 52 and sidewall 42. Operation of the first and second cylinder and piston assemblies 82 and 84 moves pivot platform 52 between first and second positions.

Figure 6:
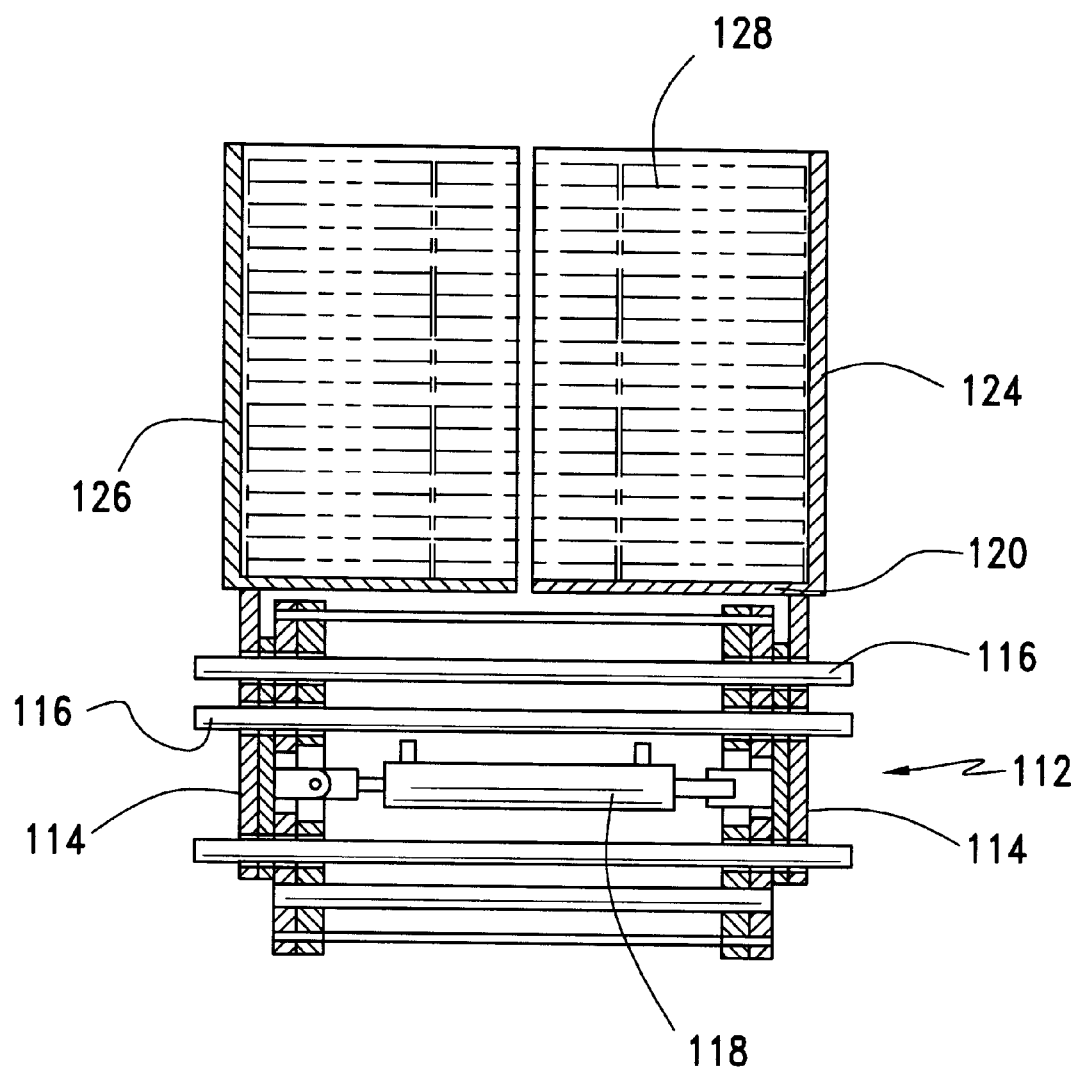
FIG. 6 is an elevational view of the matrix former of FIG. 1.

Referring now to FIGS. 3, 4 and 6, matrix former 18 can be seen to comprise a reversible motor 90 for rotating a drive shaft 92 approximately 180 degrees between first and second positions. Plate 94, having first and second ends 96, is supported on shaft 92, and first and second arms 98 are attached to the ends 96 of plate 94. Arms 98 are connected to a shaft 100 by a triangular plate member 102. One end of shaft 100 is connected to a first vertex of plate member 102, while arms 98 are connected to the other two vertices of the triangular plate member 102. Shaft 100 is securely supported by two bearing plates 104 fixedly mounted to a support structure 106, as best shown in FIG. 1. An L-shaped support 108 depends from shaft 100 and includes a projection 110 for supporting an actuating assembly 112. Actuating assembly 112 comprises side plates 114 connected by telescoping cylinders 116 and an actuator 118. The matrix former 18, as best shown in FIG. 3, further includes a patty-receiving platform 120 having three slots 122 therein, a first sidewall 124 connected to one of the side plate 114, and a second sidewall 126 connected to the other of the side plates 114. (The slots 122 are narrower than the width of the patties to be placed thereover.) The sidewalls 124 and 126 are movable toward and away from each other by operation of the actuating assembly 112 which is attached to the two side plates 114. FIG. 6 illustrates three stacks 128 of hamburger patties between the sidewalls 124, 126 of the matrix former 18 in a closely spaced relationship.

In operation, a first set of three stacks of hamburger patties is placed onto receiving platform 120, one stack over each of slots 122, by a stack placing device (not shown). A second set of three stacks is then placed on receiving platform 120 next to the first set of stacks by the stack placing device. The stacks are formed with a spacing between them, and are thus transferred to the receiving platform 120 with a spacing. To remove or substantially decrease this spacing, controller 51 operates actuator 118 to move side plates 114, and thus first and second sidewalls 124 and 126 which are connected to side plates 114, toward each other to slide the patties toward one another and form a tighter matrix of patties.

FIGS. 7 through 15 illustrate the interaction of the lift mechanism 16 and the matrix former 18 during one patty boxing operation. In FIG. 7, system 10 can be seen with an empty box 130, having an opening 132, that has been released to slide down box feed roller conveyor 12 toward and onto roller support 70 of lift platform 40. At this stage, matrix former 18 already holds six stacks (two rows of three stacks each) of hamburger patties. Once box 130 is received on roller platform 70, sliding side walls 66 are moved toward each other and toward box 130 by actuator 68, until they engage the sidewalls of the box and hold box 130 securely on platform 70. Actuators 76 pivot fingers 74 and move them into the opening 132 of box 130, where they further secure the box to the roller platform 70 and help hold down any flaps that the box might have. Platform 70 is then pivoted to the position shown in FIG. 8, with its surface generally normal to guide tracks 36. First cylinder and piston assembly 82, with a first end connected to first sidewall 42, presses against crank arm 80 on first axle 60, which causes pivoting platform 52 to pivot about the axes of first axle 60 and second axle 62 from the position shown in FIG. 8 to the position shown in FIG. 9 so that roller platform 70 is positioned over matrix former 18 and with the opening 132 of box 130 facing the stacks of patties on the matrix former. Sliding sidewalls 66 and fingers 74, held in place by actuators 76, keep box 130 secured with its bottom wall against roller platform 70.

Figure 10:
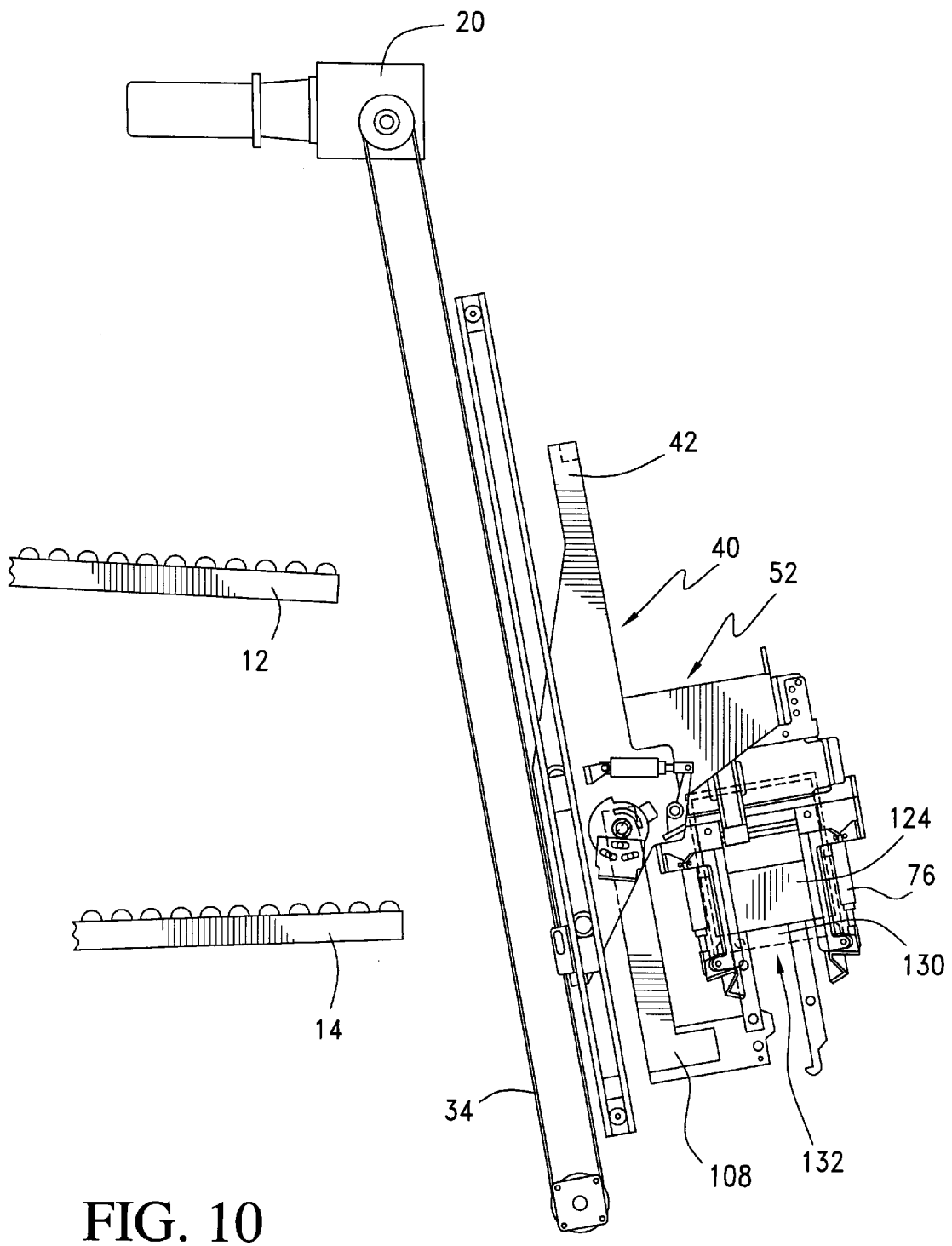
FIG. 10 is a side elevational view of the packing system of FIG. 1 in a fourth configuration with the platform held near the matrix former so that the matrix former is substantially covered by the box.
Figure 11:
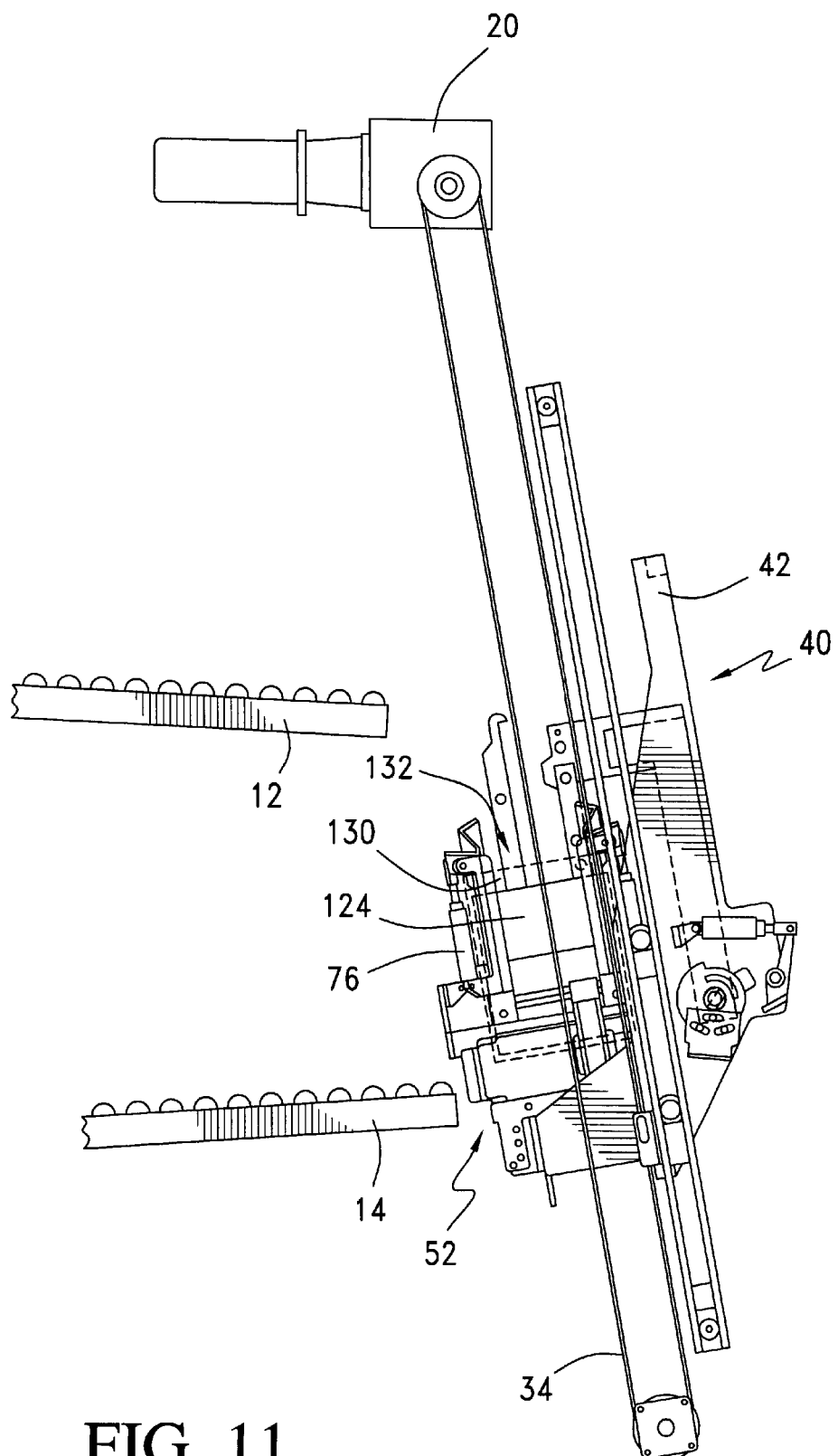
FIG. 11 is a side elevational view of the packing system of FIG. 1 in a fifth configuration with the platform and matrix former rotated 180 degrees from the position shown in FIG. 8.

Controller 51 next causes motor 20 to rotate shaft 22, in order to move belts 34 and thus platform 70 toward matrix former 18 until the sidewalls 124, 126 of the matrix former 18 and the patties on the matrix former surface 120 are inside box 130, as best shown in FIG. 10. In this position, shaft 100 of the matrix former is coaxially aligned with axles 60 and 62 of the lift platform.

Next, matrix former motor 90 actuates to rotate plate 94 and move one of the arms 98 toward shaft 100 and the other of arms 98 away from the shaft 100, thus rotating triangular plate 102 and shaft 100 connected thereto. This causes the receiving platform 120 to pivot about the axis of shaft 100. Simultaneously, first cylinder and piston assembly 82 and second cylinder and piston assembly 84 contract to pivot roller support platform 70 about axles 60 and 62, so that the box 130 on the roller support platform 70 and the patty support platform 120 of the matrix former remain essentially parallel as they rotate through 180 degrees to the position shown in FIG. 11. The patties, which had been supported by receiving platform 120 and covered by box 130, are in this new orientation supported by box 130 with the receiving platform 120 positioned thereover.

Figure 12:
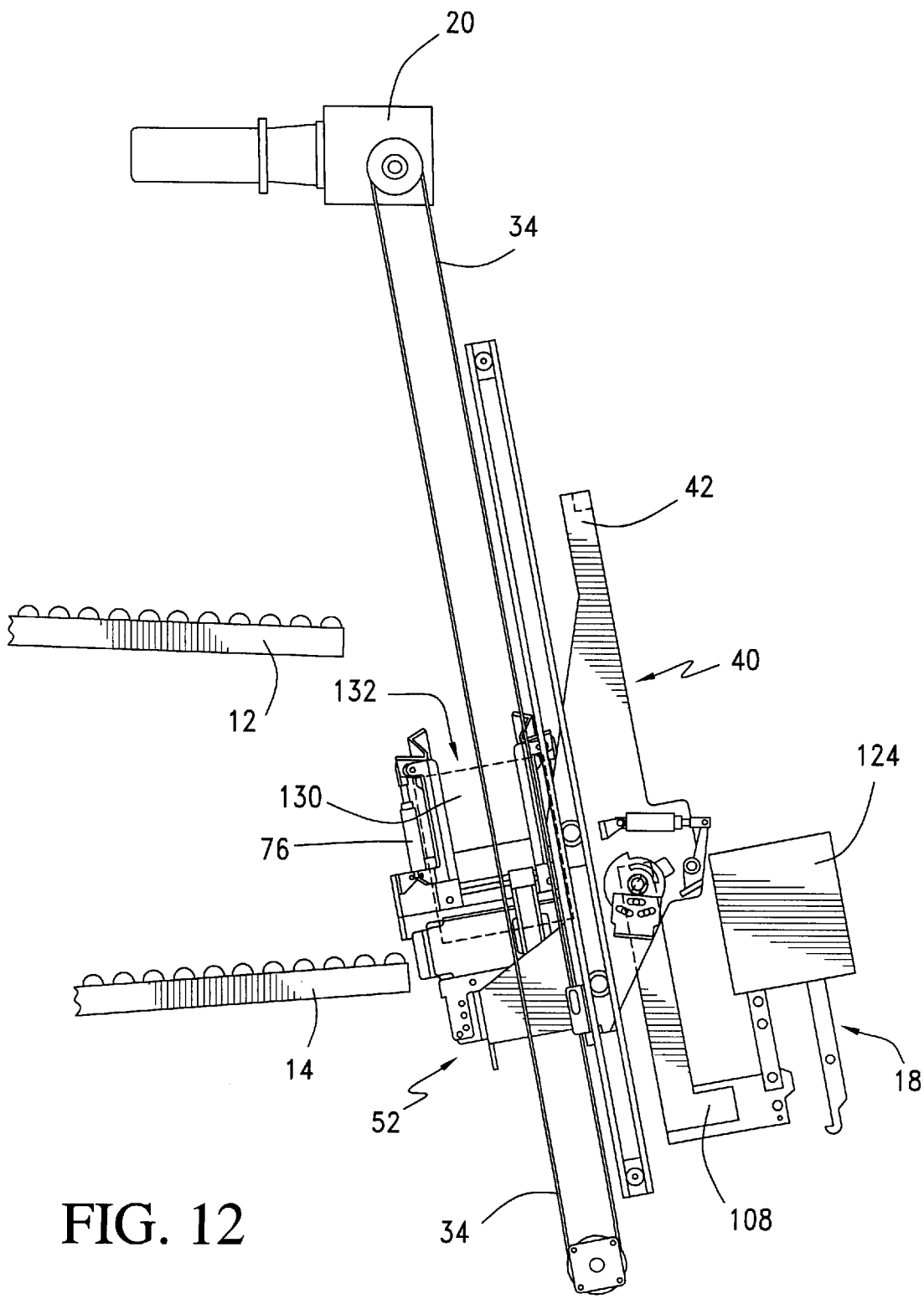
FIG. 12 is a side elevational view of the packing system of FIG. 1 in a sixth configuration with the platform moved away from the matrix former.
Figure 13:
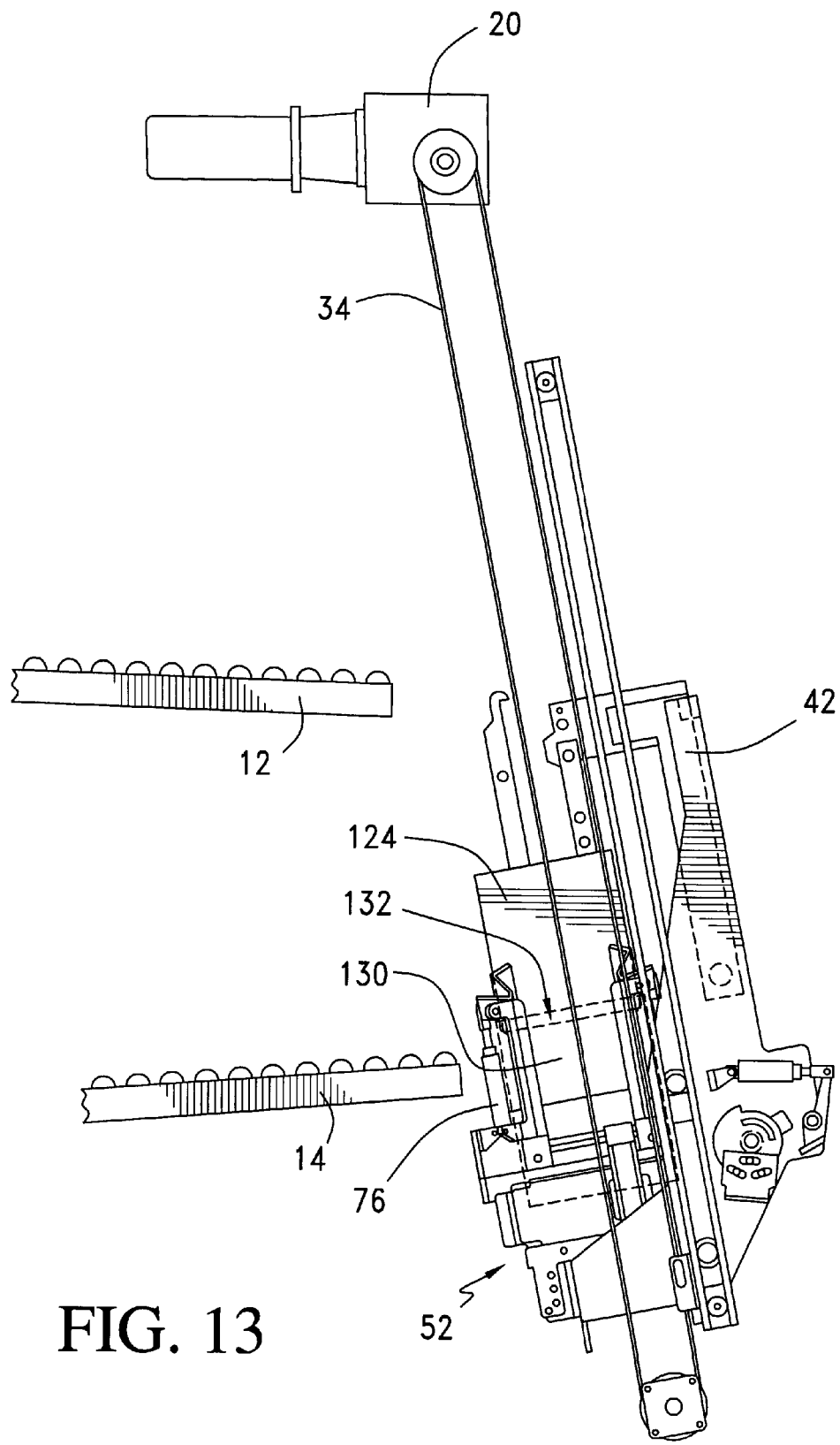
FIG. 13 is a side elevational view of the packing system of FIG. 1 in a seventh configuration showing the matrix former pivoted 180 degrees from the position shown in FIG. 10.
Figure 14:
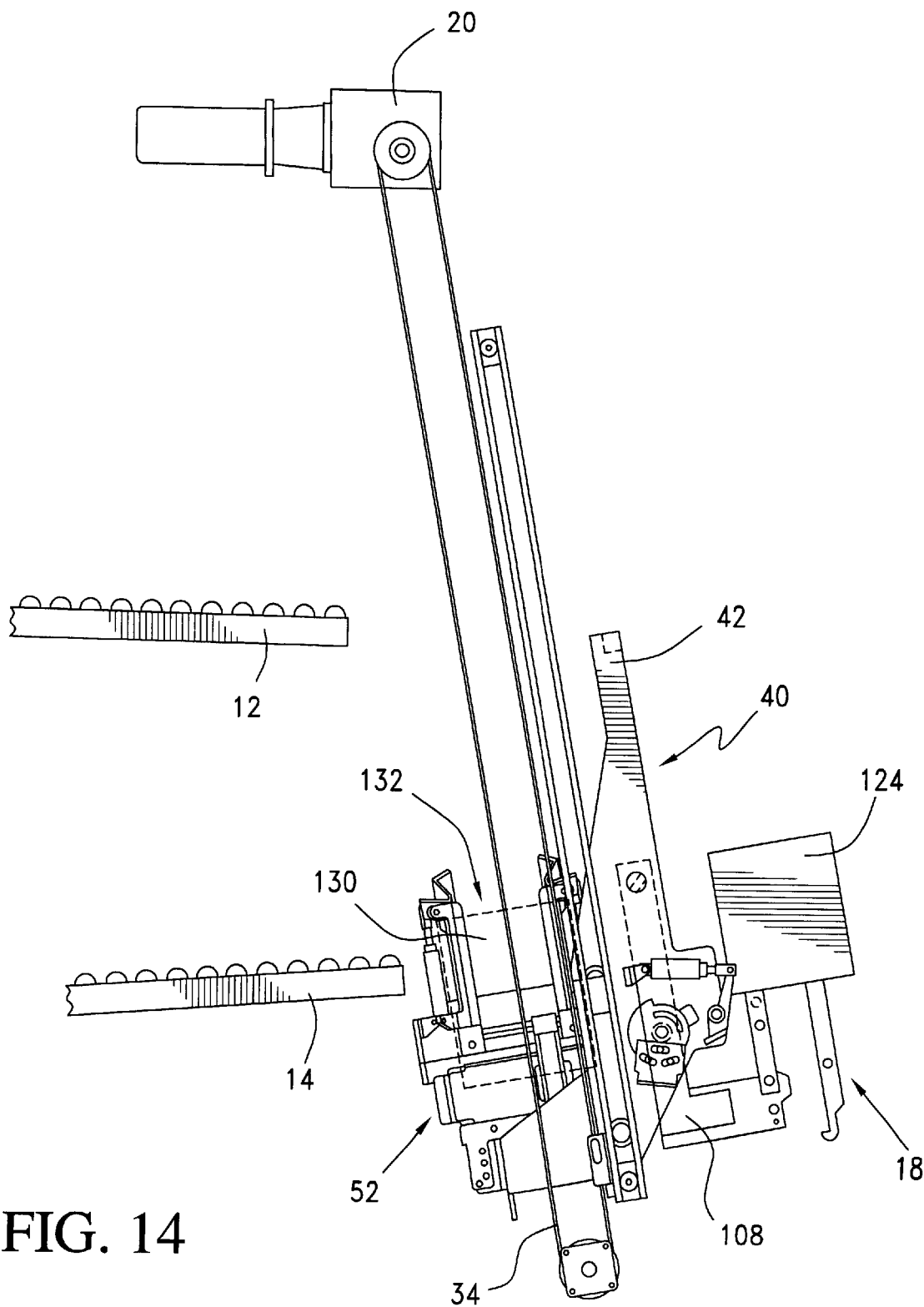
FIG. 14 is a side elevational view of the packing system of FIG. 1 in an eighth configuration with the platform and box raised to the level of the discharge conveyor.
Figure 15:
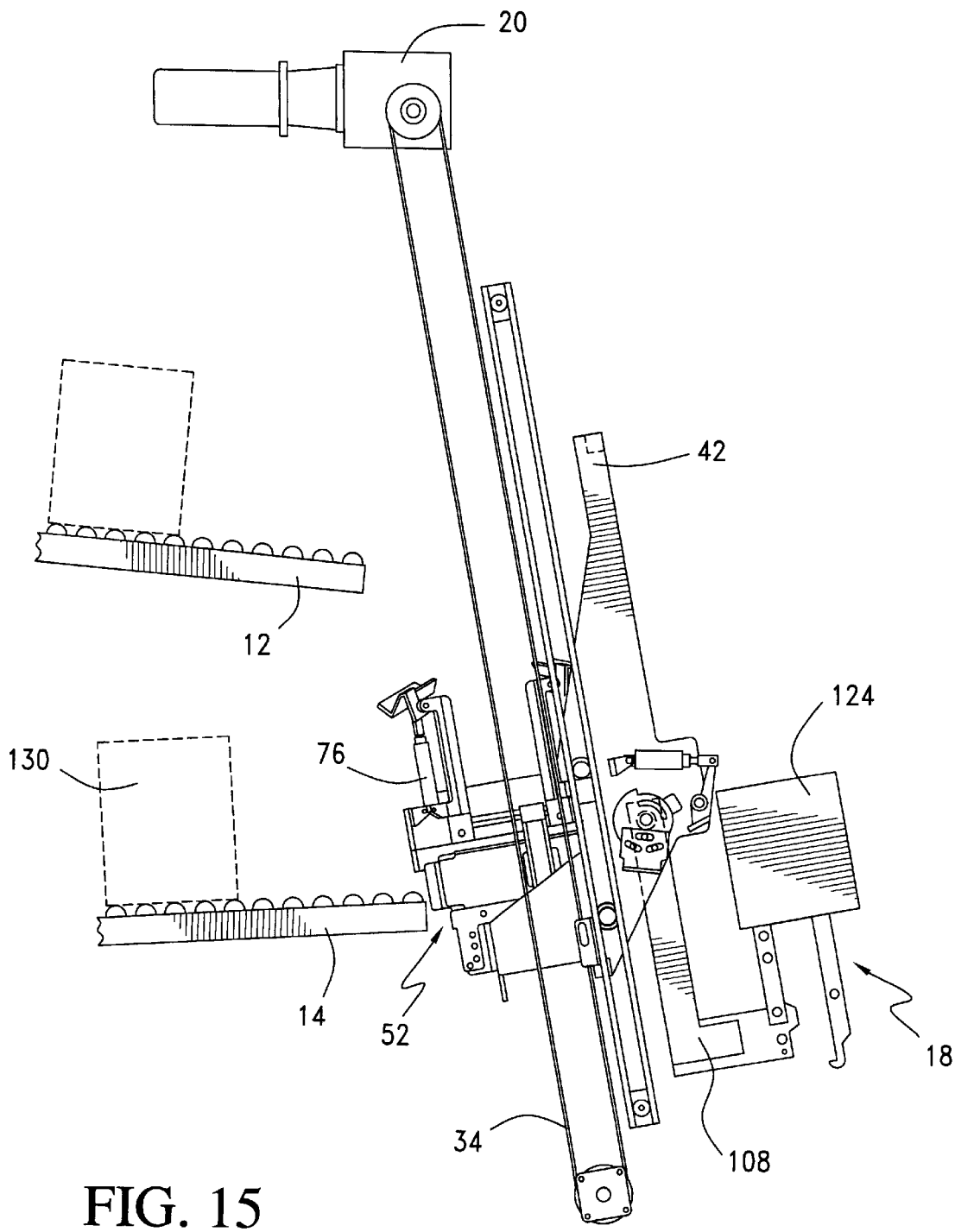
FIG. 15 is a side elevational view of the packing system of FIG. 1 in a ninth configuration showing a full box that has been released from the platform to the discharge conveyor and a new empty box in position on the feeding conveyor.

Motor 20 next rotates shaft 22 to move roller support platform 70 and box 130 thereon away from patty support platform 120 and away from shaft 22 until the patty support platform 120 is clear of the box 130, as best shown in FIG. 12. Motor 90 rotates shaft 100 to return the patty support platform 120 to its starting orientation as best shown in FIG. 13. Roller support platform 70 is next raised to the position shown in FIG. 14, generally parallel to the surface of discharge conveyor 14. Actuators 76 pivot fingers 74 out of top opening 132 of the box 130 and sliding sidewall 66 moves away from box 130. The box 130 may then slide under the force of gravity off roller platform 70 and onto the adjacent discharge conveyor 14 as best shown in FIG. 15. The lift platform 40 is then raised back toward the feed conveyor 12 to receive another box and start the cycle again.

Figure 9:
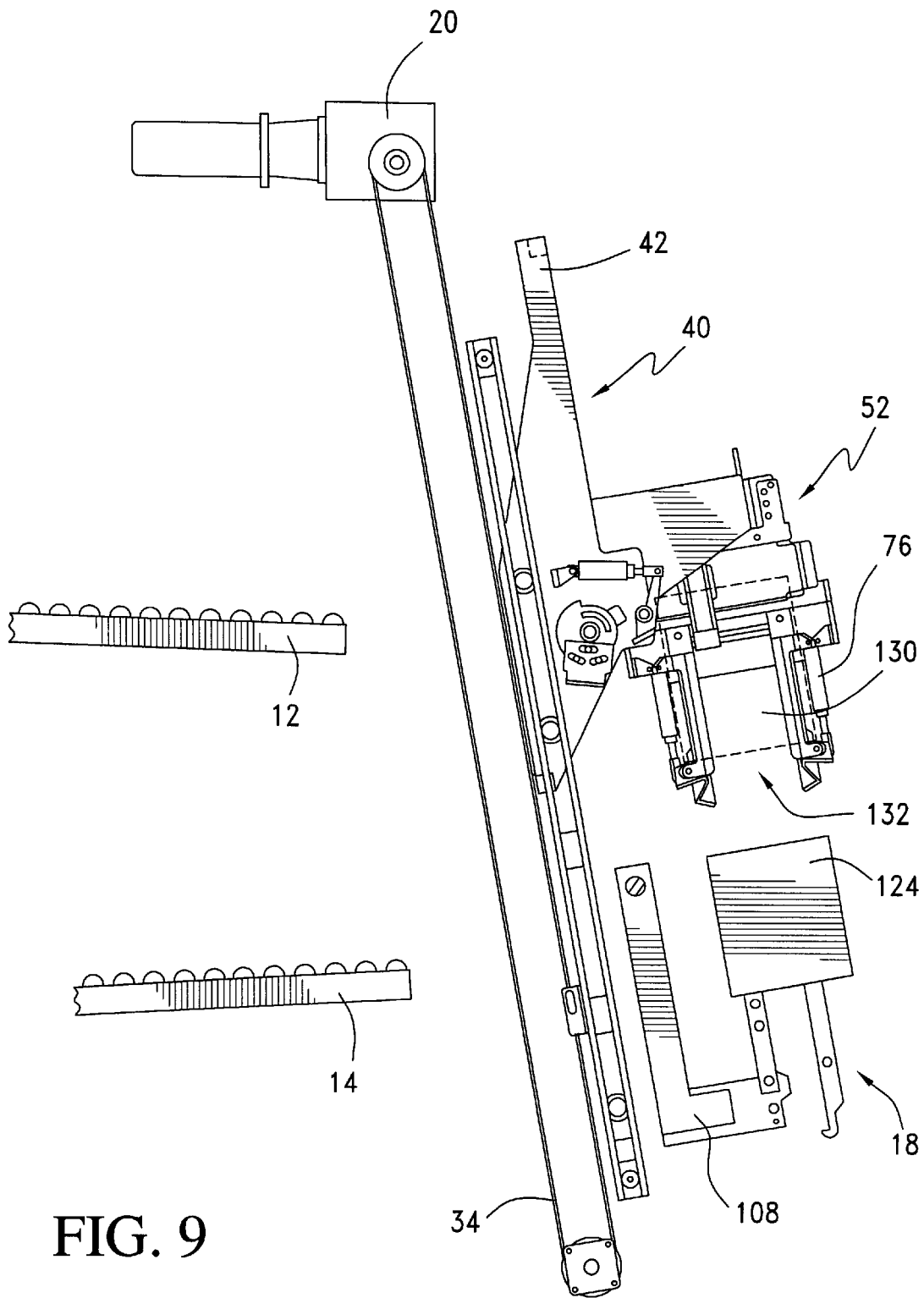
FIG. 9 is a side elevational view of the packing system of FIG. 1 in a third configuration with the platform and box positioned over the matrix former.
Figure 16:
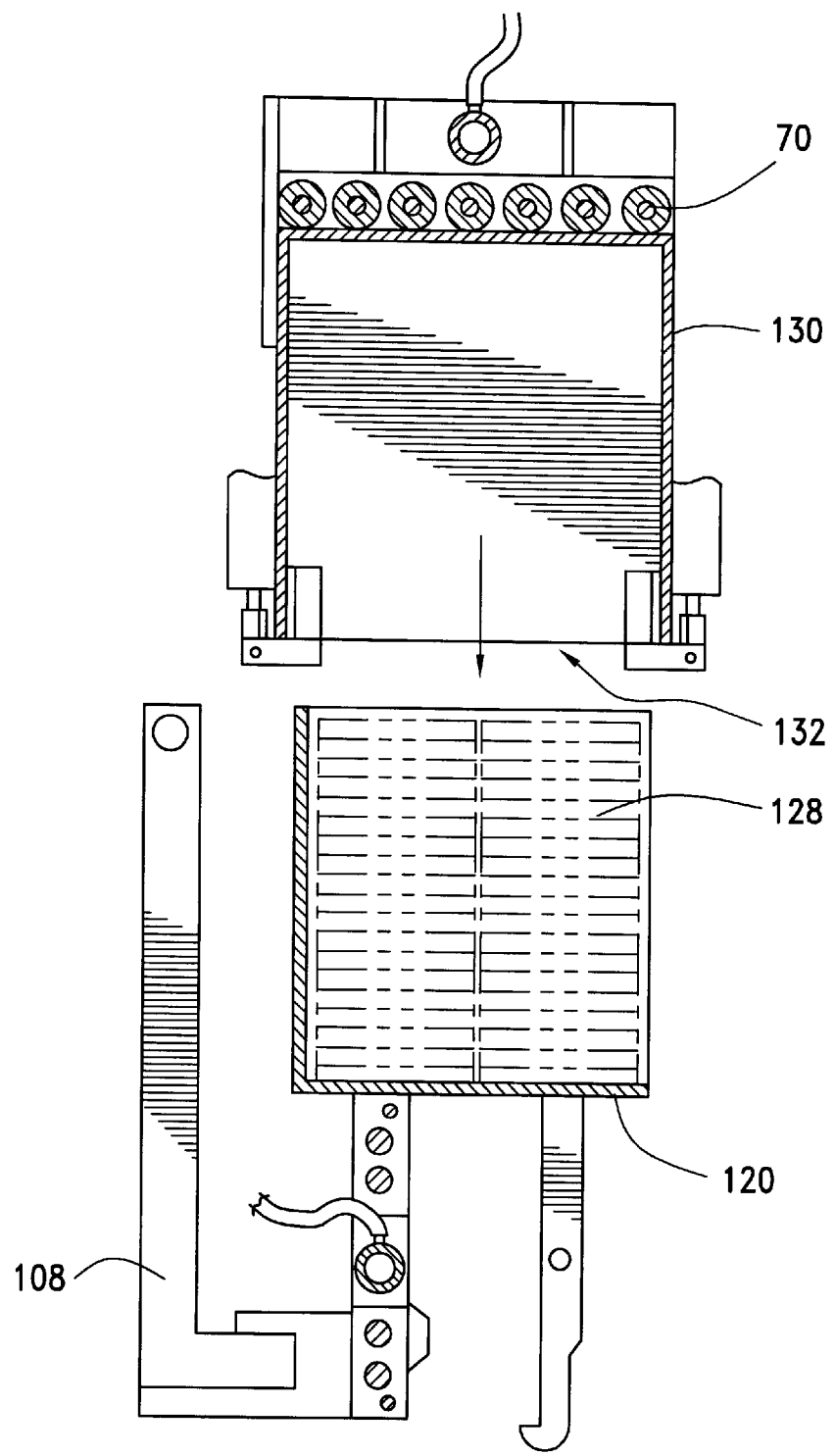
FIG. 16 is a side elevational view, partly in section, of the lift apparatus and the matrix former in a position similar to that shown in FIG. 8.
Figure 19:
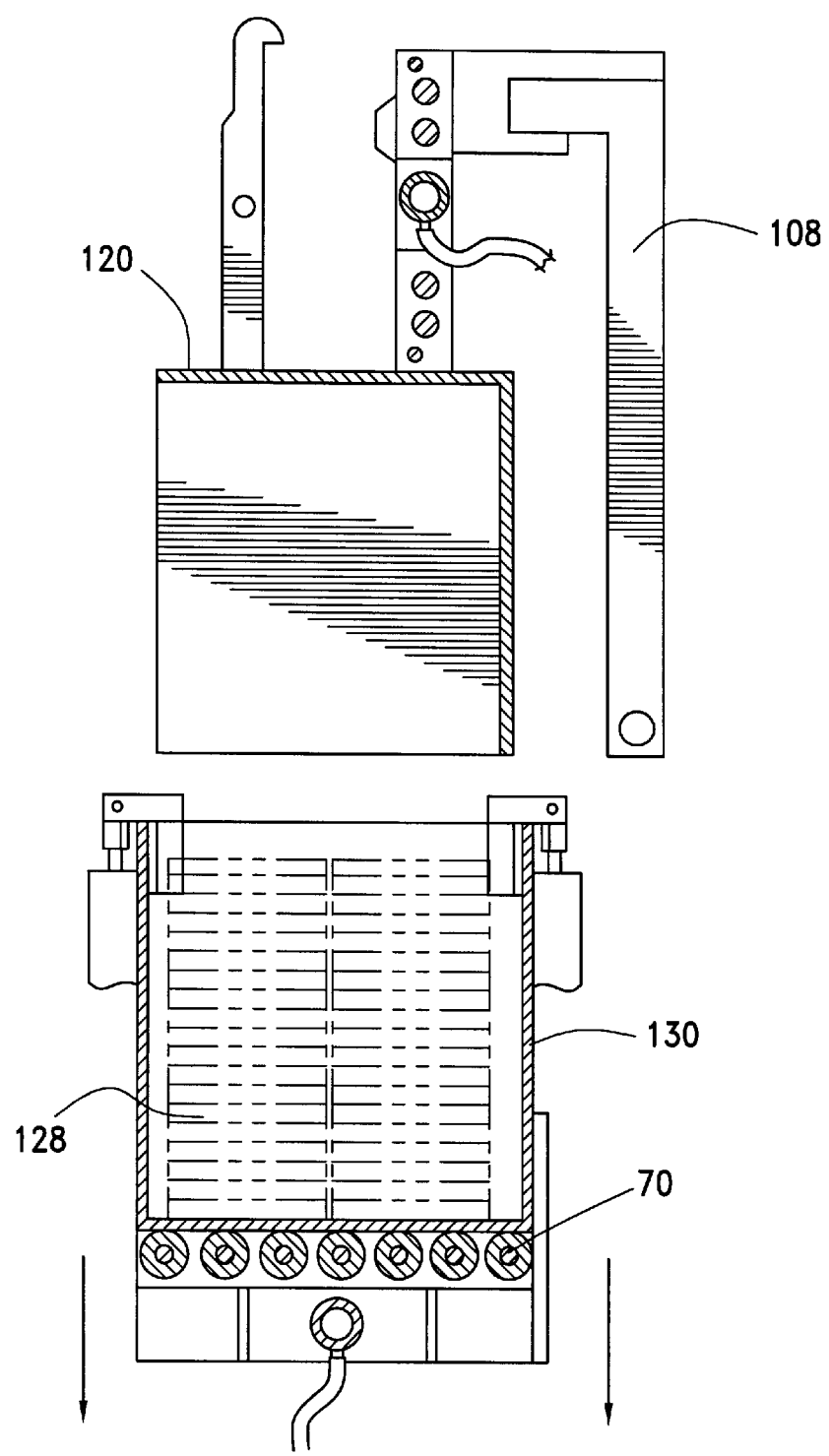
FIG. 19 is a side elevational view, partly in section, of the lift apparatus and the matrix former in a position similar to that shown in FIG. 11.

FIGS. 16–19 show in more detail the transfer of the stacks of patties 128 from the matrix former 18 to the box 130. FIG. 16 is a sectional view showing the inside of the box 130 and the matrix former 18 when the box 130 is held over the matrix former 18 as shown in FIG. 9. As can be seen in FIG. 17, the support platform 120 of the matrix former fits within the inside of box 130, with a small amount of clearance, and at about the level of opening 132. FIG. 18 shows the inside of box 130 when the matrix former 18 and lift platform 40 are positioned as in FIG. 11, so that the stacks 128 of patties are now resting on the bottom of box 130. FIG. 19 corresponds to the position of the matrix former 18 and lift platform 40 shown in FIG. 12.

The present invention has been described herein in terms of a preferred embodiment. However, numerous changes and additions to this embodiment will become apparent to those skilled in the relevant arts upon a reading and understanding of the foregoing description. For example, while the matrix former of the present invention has been described as accommodating two rows of three stacks each, it can readily be adapted, by the use of larger or smaller components, have more or fewer slots in the bottom wall, to accommodate rows having a greater or lesser number of stacks and to accommodate a greater or lesser number of rows as well. It is intended that all such changes and additions be included within this invention to the extent that they are covered by scope of the several claims appended hereto.

What is claimed is:

1. A packing apparatus comprising:
 a matrix former having a product contact surface and an adjacent at least one sidewall, said sidewall being movable relative to said product contact surface, said matrix former being pivotable about an axis parallel to and spaced from said product contact surface between a first position wherein said product contact surface faces in a first direction and a second position wherein said product contact surface faces in a second direction; and
 a platform comprising a box support having a box contact side and a box holder for holding a box having a closed bottom and open top on said box support, said platform being movable between a first position and a second position, and said box support being pivotable between a first angular orientation and a second angular orientation.

2. The packing system of claim 1 wherein said first direction and said second direction are separated by an angle of about 180 degrees.

3. The packing system of claim 1 wherein said box support includes a positioning device for positioning a box on said platform.

4. The packing system of claim 3 wherein said box support includes at least one retaining member for retaining the box on the box support.

5. The packing system of claim 3 wherein said box support includes at least one gripper for gripping an edge of the box open top.

6. The packing system of claim 5 wherein said at least one gripper comprises four grippers.

7. The packing system of claim 3 wherein the box support includes a first wall and said positioning device comprises a second, movable, wall and an actuator for moving said movable wall with respect to said first wall.

8. The packing system of claim 1 wherein said box contact side comprises a plurality of free-spinning rollers.

9. The packing system of claim 1 including at least one track for guiding the movement of said platform between the first position and the second position.

10. The packing system of claim 9 including a drive belt extending between a first wheel and a second wheel and a drive operably coupled to said drive belt, wherein said platform is coupled to said drive belt.

11. The packing system of claim 10 wherein said drive belt is parallel to at least a portion of said at least one guide track.

12. The packing system of claim 1 including an actuator for pivoting said box support between the first angular orientation and the second annular orientation.

13. The packing system of claim 1 including a feed conveyor for feeding boxes to said box support.

14. The packing system of claim 13 including a discharge conveyor for receiving boxes from said box support.

15. The packing system of claim 1, wherein said matrix former includes opposing sidewalls, at least one of said sidewalls movable toward and away from said opposing sidewall.

16. The packing system of claim 15, wherein both of said sidewalls are movable.

17. The method of claim 15, wherein said platform is linearly movable independent of said matrix former.

18. The packing system of claim 16, wherein said sidewalls are independently movable relative to each other.

19. The packing system of claim 1, wherein said platform is linearly movable independent of said matrix former.

20. A method of packing a product comprising the steps of:
- providing a first platform having a product support surface and an adjacent at least one sidewall, the sidewall being movable relative to the product support surface, the first platform facing in a first direction;
- placing a product to be packaged on the product support surface;
- providing a second platform including a box support having a box contact surface;
- aligning said second platform with a first conveyor and receiving on said box support a box having a closed bottom and an open top;
- securing the box to the box support with the closed bottom in contact with the box contact surface;
- pivoting the box support so that the box contact surface faces the first platform product support surface and the box open top faces the product;
- moving the second platform towards the first platform until the product passes through the box top opening;
- pivoting the first platform and the box support platform until the box open top faces in the first direction;
- moving the second platform away from the first platform;
- pivoting the first platform until the product support surface faces in the first direction;
- aligning said second platform with a second conveyor; and,
- releasing said box onto said second conveyor.

21. The method of claim 20, including the further step of moving the sidewall to compress the product to be packaged prior to said moving the second platform towards the first platform step.

22. A packing apparatus comprising:
- a first platform having a product contact surface and being pivotable about an axis parallel to and spaced from said product contact surface between a first position wherein said product contact surface faces in a first direction and a second position wherein said product contact surface faces in a second direction;
- at least one sidewall adjacent said first platform, said sidewall being movable relative to said product contact surface; and
- a second platform comprising:
  - a box support having a first wall and a box contact side;
  - a positioning device for positioning and holding a box on said box support comprising a second, movable, wall and an actuator for moving said movable wall with respect to said first wall;
  - at least one gripper for gripping an edge of a box having a closed bottom and open top on said box support;
  - said second platform being movable between a first position and a second position, and said box support being pivotable between a first angular orientation and a second angular orientation with respect to said first platform;
  - at least one guide track for guiding the movement of said second platform between the first position and the second position;
  - a drive belt extending between a first wheel and a second wheel and a drive operably coupled to said drive belt, wherein said second platform is coupled to said drive belt; and
  - an actuator for pivoting said box support.

* * * * *